Figure 1:
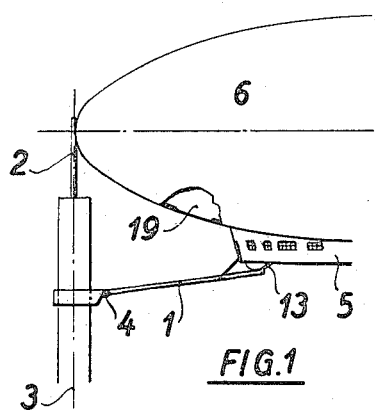

April 29, 1924.

F. GENTZCKE

LOADING AND TRIMMING APPARATUS OF AIRSHIPS

Filed Sept. 15, 1923    3 Sheets-Sheet 1

1,492,128

Fritz Gentzcke, Inventor.

by Mason Fenwick Lawrence, attys

April 29, 1924.

F. GENTZCKE 1,492,128

LOADING AND TRIMMING APPARATUS OF AIRSHIPS

Filed Sept. 15, 1923   3 Sheets-Sheet 3

Fritz Gentzcke, Inventor.
By Mason Fenwick + Lawrence atty

Patented Apr. 29, 1924.

1,492,128

UNITED STATES PATENT OFFICE.

FRITZ GENTZCKE, OF ZEESEN, NEAR KONIGSWUSTERHAUSEN, GERMANY, ASSIGNOR TO THE LUFTFAHRZEUBAU SCHUETTE-LANZ, OF MANNHEIM-RHEINAU, GERMANY.

LOADING AND TRIMMING APPARATUS OF AIRSHIPS.

Application filed September 15, 1923. Serial No. 662,939.

*To all whom it may concern:*

Be it known that I, FRITZ GENTZCKE, citizen of the German Republic, residing at Zeesen, near Konigswusterhausen, Germany, have invented certain new and useful Improvements in Loading and Trimming Apparatus of Airships (for which I have filed applications for patents in Germany August 26th and 28th, 1922), of which the following is a specification.

It is known to moor airships at a rotatable point, in particular at a mast or tower, and to provide passages for persons and goods going through the fore-end of the ship towards the said mast. The transport, particularly of persons, is in most cases very inconvenient inasmuch as they have to take their way from the car or cabin located below the ship into the hull of the ship, thence through a long gangway to the bow of the ship and thence over a gangway to the mooring mast. Frequently, however, the necessary space for this kind of transport is not at all available and in most cases said space cannot be provided except with great difficulty, so that there is an urgent want of a bridge structure for modern airship harbours adapted to overcome those disadvantages and to ensure a convenient communication between the mast and the ship for loading and unloading purposes.

Hitherto the loading and unloading of airships usually has been accomplished, either manually or by means of mechanical arrangements placed or let down into the ship, whilst liquids are forced immediately by means of suitable conduits, into containers provided on board the ship for the purpose. Occasionally loads such as the baggage of the crew, spare parts and the like are transferred within the ship, and this is done by hand only and not systematically. The transferring of heavy loads and large amounts thereof such as are to be disposed of in airships for modern traffic, obviously cannot be accomplished in this manner expeditiously, the less so since they must, from static points of view, be distributed over the length of the ship in a predetermined manner, and further the number of loading places is not optional or indefinite but rather limited, under circumstances, to a single one. This e. g. is the case if the ship is moored to a mast. In this case a further disadvantage arises from the fact that the farther the unloading place is remote from the rotary point of the ship, the more difficult it will be to bring the loads close to and into the vertically and horizontally moving ship or to unload and carry them off the ship.

In case heavy loads and large amount of loads have to be discharged it will be necessary, on the other hand, from static points of view, to proceed to unload in such manner that the balance or trim of the ship will be maintained in a suitable manner. This might be brought about, it is true, by water ballast or by substituting loads in a mechanical manner. Both ways are objectionable on account of various disadvantages. The present invention overcomes the inherent disadvantages of the old method of trimming the ship whilst unloading and affords a communication between the landing mast and an easily accessible place of the passengers' car or cabin or the stowing room. The transporting means are also provided to carry the loads from various parts of the ship to the place of discharge and thence to the mast. Thus a gradual alteration of the trim may be obtained as required by the transporting and discharging of the loads notwithstanding the movements of the ship.

The subject matters of the invention are illustrated by the Figures 1 to 18 of the accompanying drawings by way of example.

Figure 3:
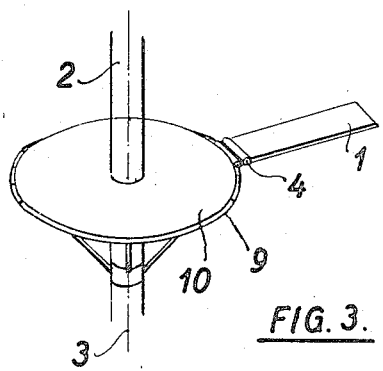
Figure 2:
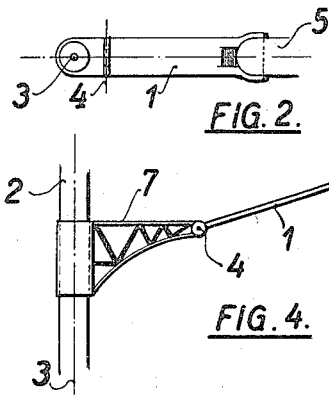
Figure 6:
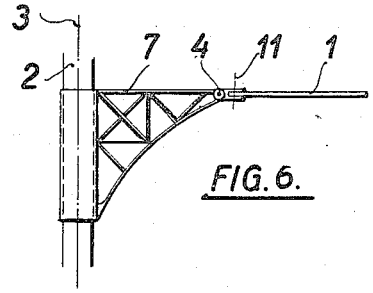
Figure 7:
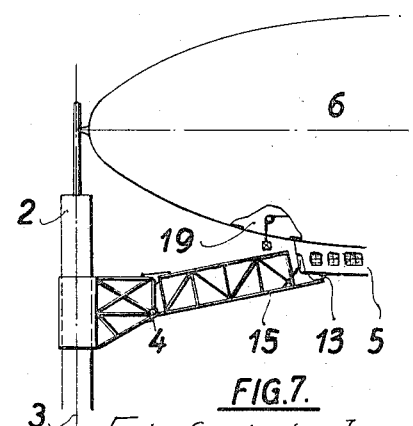
Figure 8:
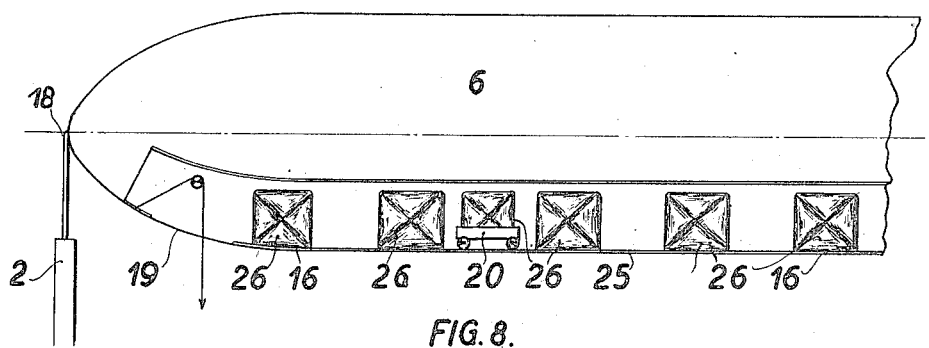
Figure 9:
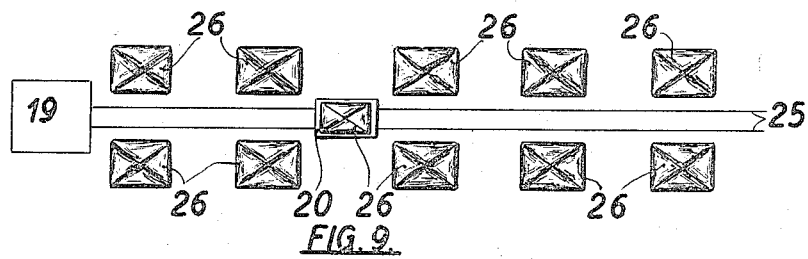
Figure 10:
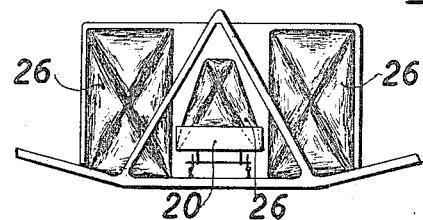
Figure 11:
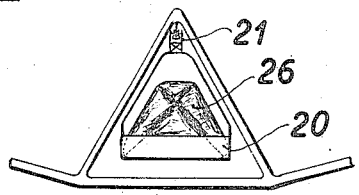
Figure 12:
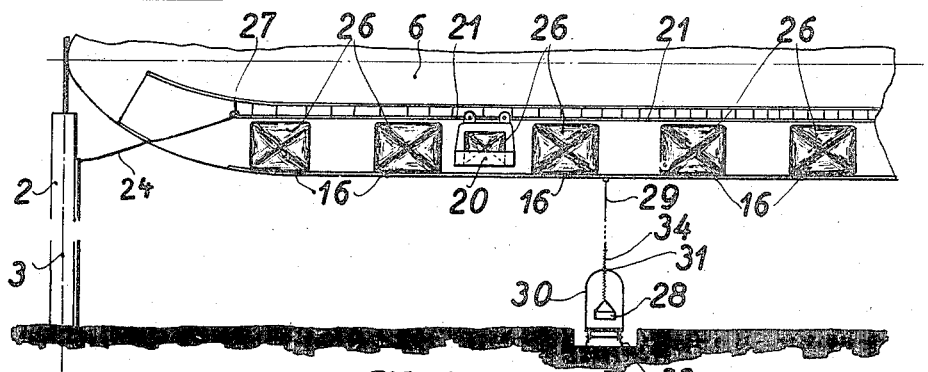
Figure 13:
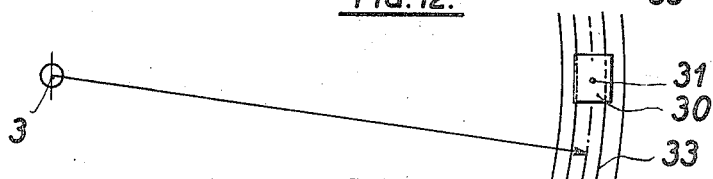
Figure 14:
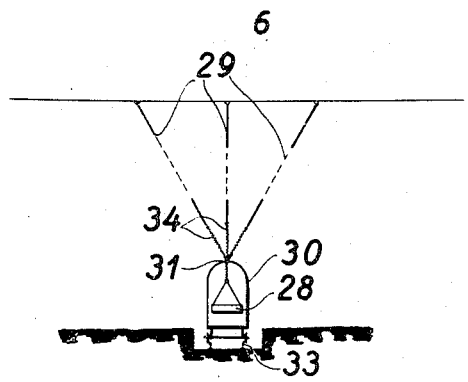
Figure 15:
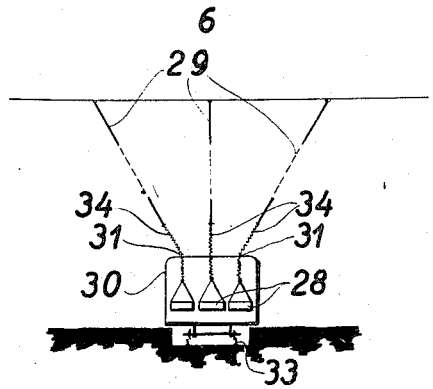
Figure 16:
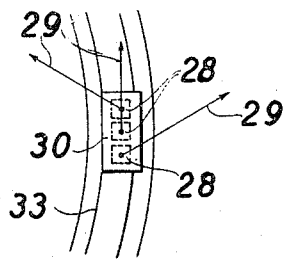
Figure 17:
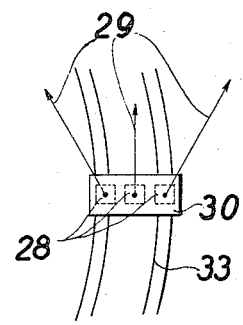
Figure 18:
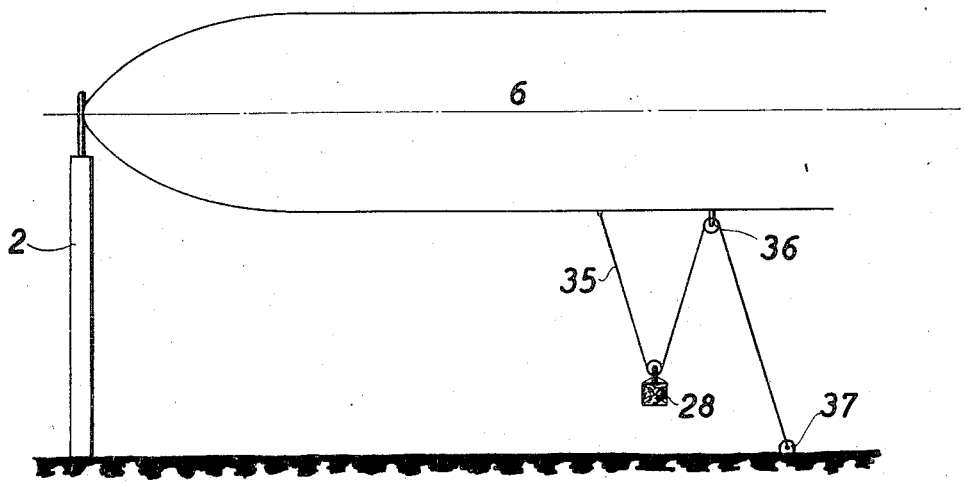

In the drawings Figure 1 is an elevation of the moored or anchored airship, Figure 2 is a plan view thereof, Figure 3 is a diagrammatic view of the platform of a mast with a bridge connected thereto, Figures 4 to 7 are elevations of modifications of the structure shown in Figure 1, Figure 8 is a longitudinal sectional view of the ship and of the gangway, Figure 9 is a plan thereof, Figures 10 and 11 are cross-sections of the lower portion or bottom of the ship and the gangway, Figure 12 is a longitudinal sectional view of the ship and the gangway with a trim balancing anchorage on the soil, Figure 13 is a plan thereof, Figures 14 and 15 illustrate two embodiments of the anchorage in elevation, Figures 16 and 17 are plan views thereof and Figure 18 is an elevation of the airship in connection with an anchorage of a simple kind.

The bridge 1 which affords a communication between the mast 2 and the ship 6 must be constructed so as to be able to follow the vertical and horizontal movements of the ship. For this reason the bridge is constructed and mounted, as shown in Figures 1 and 2, to be pivotally movable about a horizontal axis 4 and a vertical axis 3, the arrangement being such that the bridge can be turned about the horizontal axis 4 from below towards the bottom 13 of the passengers' car or cabin 5 or the hull 6 so as to be in temporary resilient connection therewith allowing lateral movements about the vertical axis 3 to take place simultaneously with rotary movements of the airship.

Figure 4:
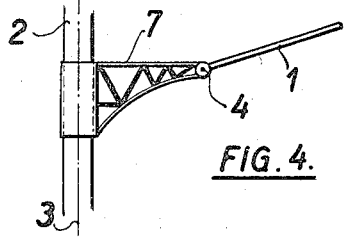

In the embodiment shown in Figures 1 and 2 the said movable bridge 1 is pivotally connected directly to the mast 2, whilst in the modification illustrated in Figures 3 and 4 a platform 10 or a boom 7, respectively, are interposed to which the bridge is pivoted.

Figure 5:
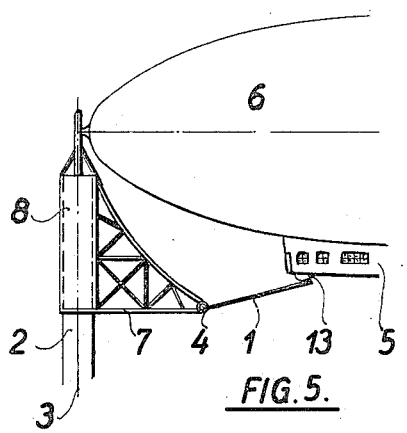

In the embodiment shown in Figure 5 both the ship 6 and the bridge 1 are attached to a rotary head 8 on the mast and to this end the said head is provided with a kind of a boom 7 with which the bridge is directly and pivotally connected, whilst the ship is moored to the top portion of the head. In the modification shown in Figure 3 the platform 10 is in the shape of a disk and provided at its circumferential edge with a guiding path 9 for the bridge to travel therearound as required and as will be readily understood.

As will be seen from Figure 4, the boom 7 carrying the horizontal pivot or axis 4 of the bridge is mounted to turn about the mast 2 and similarly the platform 10 may be constructed and mounted to turn about the mast 2 so that the guiding path 9 in Figure 3 and the cooperating parts of the bridge can be dispensed with and a simple pivotal connection, such as 3, will have to be maintained. Further in order to increase or facilitate the pivotal movability in horizontal direction the bridge 1 in Figure 6 is constructed and mounted to be rotatable about a second vertical axis 11 of a shorter radius of rotation than that of the central or main axis 3.

The platform 10 and the boom 7 mainly are provided for the purpose of shortening the length of the bridge and to thereby reduce the weight of the movable part and to facilitate the handling thereof. To these ends the bridge preferably may be counterbalanced by an appropriate and adequate weight and, further, may be constructed of light profile iron or the like. Generally speaking the rotary or pivotal axes of the ship and the bridge need not coincide and for this reason strains due to severe shocks or jerks must be avoided under any circumstances and, therefore, the connection between the two is made to be resilient or yielding. Care is to be taken that the ship is not damaged or injured, anyhow, at the moment of coming in contact with the bridge and for this reason the bridge is constructed and mounted to be liftable from below, so that the bridge cannot come in contact with the ship 6 or with the cabin 5 except at the end of its lifting movement when the connection with the hull or the cabin will be accomplished from and through the crew of the ship, thus ensuring the contact of the bridge with certain parts of the ship only which are suitably constructed and fitted for the purpose. With this object in view preferably a shock absorber 13 at the bottom of the cabin of known construction and arrangement may be used to serve as a resilient abutment or cushion for the contacting end of the bridge. A bridge of the kind firmly secured to the bottom of the cabin will be readily accessible for the passengers with the aid of a ladder or the like whilst goods may be discharged immediately through a hatchway of the hull onto the bridge. In some cases it will be advisable to provide a second bridge especially for loading and unloading goods and such loading bridge may be constructed and arranged to allow of being lifted as high as to come near the level of the hatchway. The two bridges may be located side by side or the one above the other one. In the latter case the two bridges may be constructed to form a double bridge structure 15 as shown in Figure 7. The length of the bridge obviously must be in conformity with the requirements of the different dimensions of the ships, that is to say, adapted for use with ships of different size, and to this end the bridge may be made of a length sufficient for ships of any size, or be of adjustable construction, or be pivotally connected to a platform or a boom of adjustable length or size, or otherwise a plurality of bridges of different lengths may be provided on the mast or turret.

The landing bridges transmit the weight of the loads moved over them partly to the ship and partly to the mast. As long as the load is moved on the bridge between the ship and the horizontal turning axis of the bridge in a direction towards the mast, a constantly and gradually increasing lightening of the ship takes place. The same is true with respect of the movement of the loads or goods within the ship in a direction towards the hatchway in the forepart of the ship. The required trim balance is readily ensured by such a gradual unloading or lightening in contradistinction to a sudden unloading or lightening as heretofore exercised by unloading the goods immediately from the ship to the ground, as will be clearly understood from the following explanation.

The trim is balanced or equalized by means of a corresponding number of so-called mass-points with which the lightened points (rings) of the ship etc. are connected through ropes or cables etc. and the mass of which is changed in accordance with the lightening of the point of the ship belonging thereto. Said mass-points may be united in one or in a plurality of vehicles which are readily movable on circular paths about the vertical turning axis of the ship, and they may be united in a manner that they will have a limited play or clearance in vertical direction. In case of loading the reverse action or operation is to take place.

Means and arrangements suitable for carrying out this method are shown in the Figures 8 to 18. In the construction illustrated in Figures 8 to 10 the loads or goods 26 are transported from their places of deposit 16 in the airship which is moored or anchored to the mast 2, to a place 19 at the fore-end of the ship so as to be in closer vicinity of the turning axis of the ship, by means of trucks on rails or cards 20 running on rolls so as to distribute their weight to a greater width on the path or track 25 or the bottom of the hull, generally speaking, which is a noticeable advantage in consideration of the light construction of an airship. Figures 11 to 13 illustrate a different transporting mode by means of one or several suspension-railways 21 which preferably are pivotally mounted to depend from the upper girder of the gangway in order to not be subject to the moments caused by lateral displacement of the suspended loads or goods.

The passengers always use the bridge for entering and leaving the cabin or car. The discharge of the loads or goods 26 from the point 19 of the ship towards the mast 2 or any other place outside of the ship is accomplished by conveying or letting them down, either alone or together with the carts or trucks 20, vertically or in a diagonal line, or in any other suitable way through the hatchway or the like onto the landing bridge 1. In case of a suspension-railway being provided in the ship a supplemental cable-way or railway 24, Figure 12, may be provided and used for the purpose, the said cable-railway 24 being partly suspended at the ship and coupled with the railway 21, as shown at 27, so that both form, as a unit, a complete discharging track for the vehicle or vehicles 20.

The vehicles such as trucks, carts or the like may be interconnected by means of ropes or cables and they may be driven by a motor of any suitable construction and location, and furthermore the arrangement may be such that the said vehicles are moved on a closed track or in a closed circuit. The distance between the single vehicles or the length of their coupling devices obviously is to be chosen in consideration of and in accordance with the supporting capacity of the supporting members or parts.

To balance or compensate the lightening brought about by the described arrangement, and the change of trim caused thereby mass-points are employed in Figures 12 and 13, that is to say, e. g. containers 28 suspended from the individual rings of the ship by means of ropes or cables 29 and adapted to be filled with a load, such as water, gradually in conformity with the gradual lightening of the load on the rings. In order to prevent the said containers from sliding or striking on the ground or getting out of order due to the vertical and horizontal movements of the ship, they are suspended in vertical and horizontal direction, and this may be accomplished e. g. by fixing the vertical guide 31, Figures 12, 13, in a vehicle 30 adapted to run with a least possible resistance, on a circular railway 33 having its centre in the mast 2 or axis 3. The vertical movement of the mass-points is preferably limited by springs 34, or by other suitable elastic or damping devices, in order to avoid shocks and jerks. The same holds for horizontal movements.

In order to simplify the construction and handling several or all of the mass-points (containers 28) may be assembled on a single vehicle, as shown in Figures 14 to 17. The vehicle may run on a track, as heretofore described, or may be a vessel floating on water, and the working operation of the motor employed for driving the vehicle or vessel may, if desired, be controlled by the suspending rope or cable 29 by way of its deviation from the vertical direction. In lieu of the mass-points (containers) also any other suitable means may be employed, such as for example spring-actuated drums and the like, allowing the power which is to be imparted to the rope or cable, to be regulated at will.

In case of slight movements of the airship, e. g. at calm, the arrangement shown in Figure 18 may be sufficient to answer the purpose aimed at. In Figure 18 a rope or cable 35 depending from the ship is suspended to form a loop by running over a roller 36 at the bottom of the ship and thence to a fixed or a movable point 37 on the ground. The balancing or compensating load 28 (mass-point) is suspended in the said loop by means of a roller. In case of turning movements of the ship the load remains approximately the same, but the load will be raised more and more in accordance with a vertical removal of the ship from the ground and the point 37 of the ground. Preferably means may be provided for the load to readily slide or move on the ground properly prepared for the purpose.

What I claim is:—

1. The combination with a mooring mast for airships, of a landing bridge connected to said mast and adapted to extend to the ship anchored thereto, the bridge being connected to the mast for turning about horizontal and vertical axes and adapted to be turned and raised from below toward the ship.

2. The combination with a mooring mast for airships, of a landing bridge connected to said mast, said connection including a turnable platform to which the bridge is pivotally connected.

3. The combination with a mooring mast for airships, of a turnable head mounted on the mast, and a bridge connected to said head for turning movement about vertical and horizontal axes.

4. The combination with a mooring mast for airships, of a suspension railway extending from said mast to the ship anchored thereto, said ship having a suspension railway connecting with the said railway at the point of discharge through the hull of the ship.

In witness whereof, I have hereunto subscribed my name in presence of two witnesses.

FRITZ GENTZCKE.

Witnesses:
ENNO BENSER,
OTTO BARSTFOR.